US009153061B2

(12) United States Patent
Vaddadi et al.

(10) Patent No.: US 9,153,061 B2
(45) Date of Patent: Oct. 6, 2015

(54) SEGMENTATION OF 3D POINT CLOUDS FOR DENSE 3D MODELING

(75) Inventors: Sundeep Vaddadi, San Diego, CA (US); Andrew Moore Ziegler, La Jolla, CA (US); Onur C. Hamsici, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 331 days.

(21) Appl. No.: 13/619,234

(22) Filed: Sep. 14, 2012

(65) Prior Publication Data

US 2013/0293532 A1 Nov. 7, 2013

Related U.S. Application Data

(60) Provisional application No. 61/642,848, filed on May 4, 2012.

(51) Int. Cl.
*G06T 15/00* (2011.01)
*G06T 7/00* (2006.01)

(52) U.S. Cl.
CPC ............. *G06T 15/005* (2013.01); *G06T 7/0081* (2013.01); *G06T 2207/10028* (2013.01); *G06T 2207/20101* (2013.01)

(58) Field of Classification Search
None
See application file for complete search history.

(56) References Cited

U.S. PATENT DOCUMENTS

| 6,278,460 | B1 * | 8/2001 | Myers et al. ................. 345/424 |
| 2008/0225042 | A1 | 9/2008 | Birtwistle et al. |
| 2008/0303810 | A1 | 12/2008 | Bae et al. |
| 2009/0009513 | A1 | 1/2009 | Van den Hengel et al. |
| 2009/0080526 | A1 | 3/2009 | Vasireddy et al. |
| 2010/0085352 | A1 * | 4/2010 | Zhou et al. ................. 345/419 |
| 2010/0145666 | A1 | 6/2010 | Adachi et al. |
| 2011/0274343 | A1 | 11/2011 | Krishnaswamy et al. |
| 2011/0299770 | A1 | 12/2011 | Vaddadi et al. |

FOREIGN PATENT DOCUMENTS

WO 2011069021 A2 6/2011

OTHER PUBLICATIONS

Huang J., et al., "Automatic Data Segmentation for Geometric Feature Extraction From Unorganized 3-D Coordinate Points". IEEE Transactions on Robotics and Automation, vol. 17, No. 3, Jun. 2001, pp. 268-279XP055071158, Retrieved from the Internet : URL:http://ieeexplore.ieee.org/ielx5/70/20 312/00938384.pdf?tp= &arnumber=938384&isnum ber=20312 [retrieved on Jul. 7, 2012].
International Search Report and Written Opinion—PCT/US2013/036309—ISA/EPO—Jul. 22, 2013.

(Continued)

*Primary Examiner* — Said Broome
(74) *Attorney, Agent, or Firm* — Hunter Clark PLLC

(57) ABSTRACT

Techniques for segmentation of three-dimensional (3D) point clouds are described herein. An example of a method for user-assisted segmentation of a 3D point cloud described herein includes obtaining a 3D point cloud of a scene containing a target object; receiving a seed input indicative of a location of the target object within the scene; and generating a segmented point cloud corresponding to the target object by pruning the 3D point cloud based on the seed input.

32 Claims, 10 Drawing Sheets

(56) References Cited

OTHER PUBLICATIONS

Poon K., et al., "Segmentation of Complex Objects with Non-Spherical Topologies from Volumetric Medical Images using 30 Livewire", Medical Imaging 2007: Image Processing; Proc. of SPIE vol. 6512, 651231, Mar. 5, 2007, XP040237455, DOI: 10.1117112.700681.

International Preliminary Report on Patentability—PCT/US2013/036309, The International Bureau of WIPO—Geneva, Switzerland, Nov. 13, 2014, 8 pgs.

* cited by examiner

SEGMENTATION OF 3D POINT CLOUDS FOR DENSE 3D MODELING

CROSS-REFERENCES TO RELATED APPLICATIONS

This application claims benefit of priority from U.S. Provisional Patent Application No. 61/642,848, filed May 4, 2012, and entitled "SEGMENTATION OF 3D POINT CLOUDS FOR DENSE 3D MODELING," which is assigned to the assignee hereof and incorporated in its entirety herein by reference.

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various applications that can be performed by a mobile device or other computing device utilize three-dimensional (3D) models of objects and/or scenes. A 3D model of a rigid object or scene can be constructed by various means. One such process is photogrammetry, wherein two-dimensional (2D) features are matched and/or tracked across several images depicting a scene and triangulated to obtain their 3D locations (e.g., relative to an x, y, z coordinate system). These triangulated 3D locations obtained with respect to a scene via photogrammetry form a 3D point cloud, which is further processed to generate one or more 3D models corresponding to the scene and/or portions of the scene.

SUMMARY

An example of a method for user-assisted segmentation of a 3D point cloud according to the disclosure includes obtaining a 3D point cloud of a scene containing a target object; receiving a seed input indicative of a location of the target object within the scene; and generating a segmented point cloud corresponding to the target object by pruning the 3D point cloud based on the seed input.

Implementations of the method may include one or more of the following features. Capturing a plurality of images of the scene from respective ones of a plurality of angles with a camera; and generating the 3D point cloud based on the plurality of images. Receiving a touch gesture input corresponding to a location within a selected image of the plurality of images in which the target object is located. Displaying the selected image on a touchscreen; and receiving the touch gesture input via the touchscreen. Receiving at least one of a tap input at the location of the target object in the selected image, a swipe input at the location of the target object in the selected image, a pinch or reverse pinch input defining an area within the selected image that contains the target object, or a drag input defining an outline of the target object within the selected image or opposing corners of an area containing the target object within the selected image. Receiving the seed input includes receiving the seed input with respect to a selected image of the plurality of images; and generating the segmented point cloud includes identifying a location of the seed input within the selected image, estimating a 3D seed point corresponding to the location of the seed input, selecting a 3D point of the 3D point cloud which is nearest to the seed 3D point, and generating the segmented point cloud relative to the selected nearest 3D point. Receiving the user input includes receiving the user input prior to completing generation of the 3D point cloud and storing the user input; and generating the segmented point cloud includes recalling the user input and pruning the 3D point cloud based on the recalled user input. Capturing a video sequence of the scene, the video sequence comprising the plurality of images. Capturing a plurality of still images of the scene. Pruning the 3D point cloud using at least one kernel. The at least one kernel includes one or more of a triangular kernel or a Gaussian kernel. Adjusting one or more parameters of the at least one kernel based on kernel control input. Generating a 3D model of the target object based on the segmented point cloud.

An example of an apparatus that facilitates user-assisted segmentation of a 3D point cloud according to the disclosure includes a point cloud segmenter configured to obtain a 3D point cloud of a scene containing a target object; and an input device coupled to the point cloud segmenter and configured to receive a seed input indicative of a location of the target object within the scene; wherein the point cloud segmenter is further configured to generate a segmented point cloud corresponding to the target object by pruning the 3D point cloud based on the seed input.

Implementations of the apparatus may include one or more of the following features. A camera configured to capture a plurality of images of the scene from respective ones of a plurality of angles; and a point cloud generator coupled to the camera and the point cloud segmenter and configured to generate the 3D point cloud based on the plurality of images. The input device is further configured to receive the seed input as a touch gesture input corresponding to an area of a selected image of the plurality of images in which the target object is located. A touchscreen configured to display the selected image and receive the touch gesture input. The touch gesture input includes at least one of a tapping input, a swiping input, a pinching input, an expanding input, or a dragging input. The input device is further configured to receive the seed input with respect to a selected image of the plurality of images; and the point cloud segmenter is further configured to identify a location of the seed input within the selected image, to select at least one 3D point of the 3D point cloud located in a position associated with the location of the seed input, and to generate the segmented point cloud relative to the at least one selected 3D point. The camera is configured to capture the plurality of images of the scene as at least one of a video sequence of the scene, the video sequence including the plurality of images, or a plurality of still images of the scene. The point cloud segmenter is further configured to prune the 3D point cloud using at least one kernel. The at least one kernel comprises one or more of a triangular kernel or a Gaussian kernel. The input device is further configured to obtain a kernel control input and provide the kernel control input to the point cloud segmenter; and the point cloud segmenter is further configured to adjust one or more parameters of the at least one kernel based on the kernel control input.

An example of an apparatus that facilitates user-assisted segmentation of a 3D point cloud according to the disclosure includes means for obtaining a 3D point cloud of a scene containing a target object; means for receiving a seed input indicative of a location of the target object within the scene; and means for generating a segmented point cloud corresponding to the target object by pruning the 3D point cloud based on the seed input.

Implementations of the apparatus may include one or more of the following features. Means for capturing a plurality of images of the scene from respective ones of a plurality of angles; and means for generating the 3D point cloud based on the plurality of images. Means for receiving a touch gesture input corresponding to an area of a selected image of the plurality of images in which the target object is located. Means for displaying the selected image; and means for receiving the touch gesture input. The touch gesture input includes at least one of a tapping input, a swiping input, a pinching input, an expanding input, or a dragging input. Means for receiving the seed input with respect to a selected image of the plurality of images; and means for identifying a location of the seed input within the selected image, means for selecting at least one 3D point of the 3D point cloud located in a position associated with the location of the seed input, and means for generating the segmented point cloud relative to the at least one selected 3D point. Means for capturing at least one of a video sequence of the scene, the video sequence including the plurality of images, or a plurality of still images of the scene. Means for pruning the 3D point cloud using at least one kernel. The at least one kernel comprises one or more of a triangular kernel or a Gaussian kernel. Means for adjusting one or more parameters of the at least one kernel based on kernel control input.

An example of a computer program product according to the disclosure resides on a processor-executable computer storage medium and includes processor-executable instructions configured to cause a processor to obtain a 3D point cloud of a scene containing a target object; receive a seed input indicative of a location of the target object within the scene; and generate a segmented point cloud corresponding to the target object by pruning the 3D point cloud based on the seed input.

Implementations of the computer program product may include one or more of the following features. Instructions configured to cause the processor to capture a plurality of images of the scene from respective ones of a plurality of angles via a camera and generate the 3D point cloud based on the plurality of images. Instructions configured to cause the processor to receive a touch gesture input corresponding to an area of a selected image of the plurality of images in which the target object is located. Instructions configured to cause the processor to display the selected image on a touchscreen and receive the touch gesture input via the touchscreen. The touch gesture input includes at least one of a tapping input, a swiping input, a pinching input, an expanding input, or a dragging input. Instructions configured to cause the processor to receive the seed input with respect to a selected image of the plurality of images; and instructions configured to cause the processor to identify a location of the seed input within the selected image, to select at least one 3D point of the 3D point cloud located in a position associated with the location of the seed input, and to generate the segmented point cloud relative to the at least one selected 3D point. Instructions configured to cause the processor to capture at least one of a video sequence of the scene, the video sequence including the plurality of images, or a plurality of still images of the scene. Instructions configured to cause the processor to prune the 3D point cloud using at least one kernel. The at least one kernel comprises one or more of a triangular kernel or a Gaussian kernel. Instructions configured to cause the processor to adjust one or more parameters of the at least one kernel based on kernel control input.

Items and/or techniques described herein may provide one or more of the following capabilities, as well as other capabilities not mentioned. A 3D model of an object can be generated without physically isolating the object, thereby increasing the flexibility and speed of modeling applications. Model generation is initialized with simple user inputs, increasing intuitiveness and ease of use. Processing is performed for a segmented subset of an initial scene, thereby making 3D modeling and related processes more efficient and capable of being executed on mobile phones and other devices with limited processing capability. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Described herein are systems and methods for segmentation of 3D point clouds to assist in dense 3D modeling. As described above, photogrammetry may be utilized to generate a 3D model corresponding to an object of interest within a scene. The result of this process is a 3D point cloud corresponding to the scene. However, the resulting point cloud is mostly sparse and is cluttered with several points not lying on the object of interest but on the background and foreground. Additionally, the triangulation step may result in errors associated with the 3D points not lining up. To rectify these errors, a process called Bundle Adjustment (BA) may be performed, in which relative positions of the cameras used to capture the images are jointly rectified to obtain an improved solution of the 3D locations. However, BA is very computationally expensive and its convergence depends on the number of errors that are present and also on the amount of data being processed via the BA. Further, as the 3D point cloud is sparse, further processing such as local plane fitting is generally performed to densify the model. Similar to BA, the complexity of this further processing increases in proportion to the amount of data being processed. In general, processing of a 3D point cloud is difficult and complex when utilizing a cluttered cloud with a significant amount of background and foreground noise.

Here, a segmentation of a 3D point cloud is provided given a gestural user input. The gestural input can include, but is not limited to, touching or swiping a location within an image, outlining an area of interest within the image, performing a pinching or reverse pinching (un-pinching, spreading, etc.) motion within an area of interest within the image, etc. This input is used as a seed for corresponding segmentation on the 3D point cloud. This segmentation enables sections of a 3D point cloud corresponding to a given object within a scene to be isolated with reduced complexity and increased efficiency as compared to conventional techniques.

Figure 1:
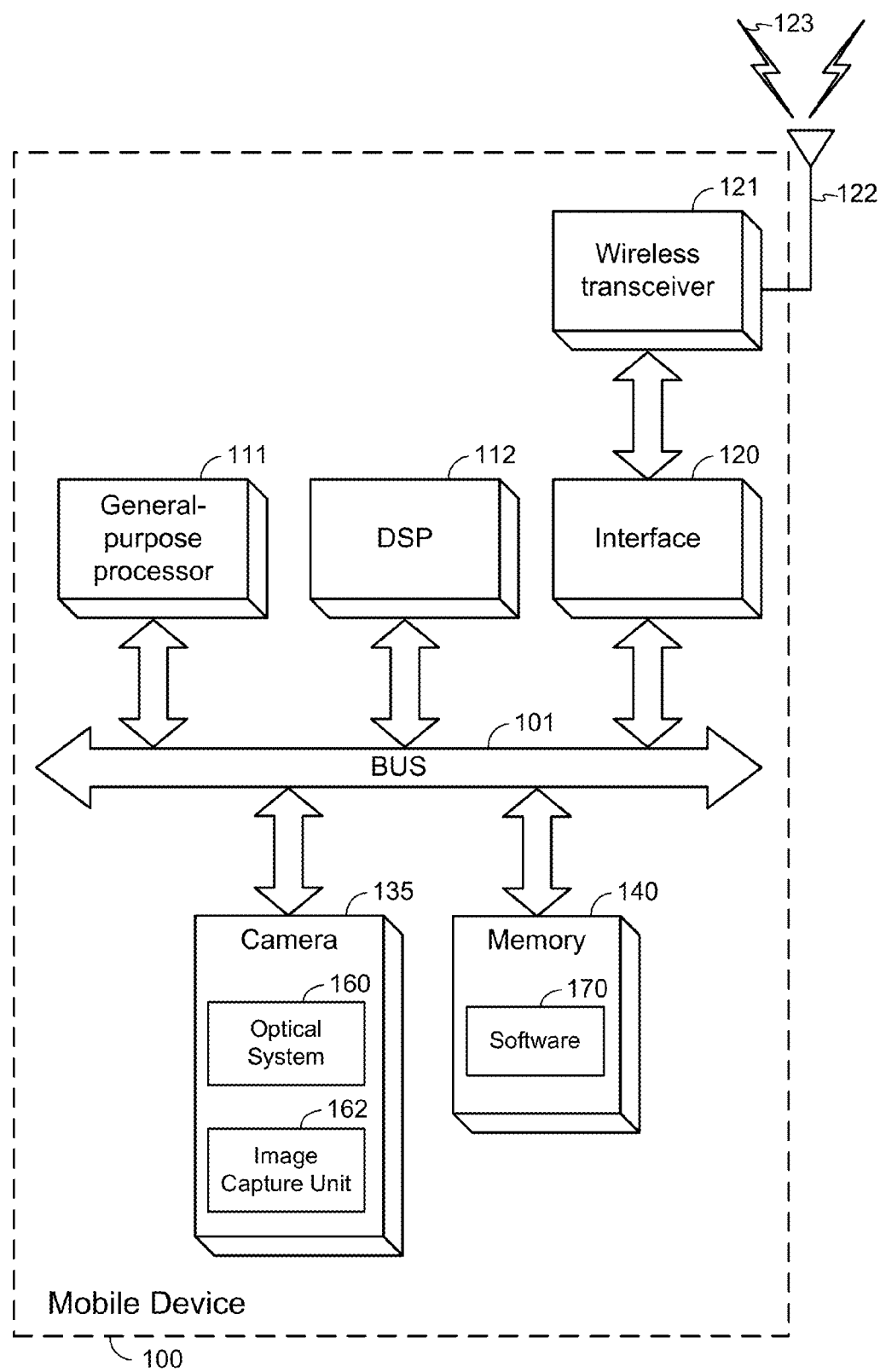
FIG. 1 is a block diagram of components of a mobile computing device.

Systems and methods described herein operate via one or more mobile devices 100. These mobile devices include, but are not limited to, personal digital assistants (PDAs), smartphones, computing devices such as laptops, desktops or tablet computers, automobile computing systems, etc., whether presently existing or developed in the future. Referring to FIG. 1, an example mobile device 100 includes a wireless transceiver 121 that sends and receives wireless signals 123 via a wireless antenna 122 over a wireless network. The transceiver 121 is connected to a bus 101 by a wireless transceiver bus interface 120. While shown as distinct components in FIG. 1, the wireless transceiver bus interface 120 may also be a part of the wireless transceiver 121. Here, the mobile device 100 is illustrated as having a single wireless transceiver 121. However, a mobile device 100 can alternatively have multiple wireless transceivers 121 and wireless antennas 122 to support multiple communication standards such as WiFi, Code Division Multiple Access (CDMA), Wideband CDMA (WCDMA), Long Term Evolution (LTE), Bluetooth, etc.

A general-purpose processor 111, memory 140, digital signal processor (DSP) 112 and/or specialized processor(s) (not shown) may also be utilized to process the wireless signals 123 in whole or in part. Storage of information from the wireless signals 123 is performed using a memory 140 or registers (not shown). While only one general purpose processor 111, DSP 112 and memory 140 are shown in FIG. 1, more than one of any of these components could be used by the mobile device 100. The general purpose processor 111, DSP 112 and memory 140 are connected to the bus 101.

The memory 140 includes a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor 111, specialized processor(s), or DSP 112. Thus, the memory 140 is a processor-readable memory and/or a computer-readable memory that stores software 170 (programming code, instructions, etc.) configured to cause the processor 111 and/or DSP 112 to perform the functions described. Alternatively, one or more functions of the mobile device 100 may be performed in whole or in part in hardware.

The mobile device 100 further includes a camera 135 that captures images and/or video in the vicinity of the mobile device 100. The camera 135 includes an optical system 160 including one or more lenses, which collectively define a field of view of the camera 135 from which images are captured. Lenses and/or other components of the optical system 160 can be housed within the mobile device 100 and/or external to the mobile device 100, e.g., as lens attachments or the like. The optical system 160 is communicatively coupled with an image capturing unit 162. The image capturing unit 162 includes a charge-coupled device (CCD) and/or other technology to convert optical images into electrical information that is transferred to one or more processing entities of the mobile device 100, such as the general-purpose processor 111 and/or the DSP 112.

While the mobile device 100 here includes one camera 135, multiple cameras 135 could be used, such as a front-facing camera disposed along a front side of the mobile device 100 and a back-facing camera disposed along a back side of the mobile device 100, which can operate interdependently or independently of one another. The camera 135 is connected to the bus 101, either independently or through a bus interface 110. For instance, the camera 135 can communicate with the DSP 112 through the bus 101 in order to process images captured by the image capture unit 162 in the event that the camera 135 does not have an independent image processor. In addition, the camera 135 may be associated with other components, such as a microphone (not shown) for capturing audio associated with a given captured video segment. The camera 135 can additionally communicate with the general-purpose processor 111 and/or memory 140 to generate or otherwise obtain metadata associated with captured images or video. Metadata associated with, or linked to, an image contains information regarding various characteristics of the image. For instance, metadata includes a time, date and/or location at which an image is captured, image dimensions or resolution, an identity of the camera 135 and/or mobile device 100 used to capture the image, etc. Metadata utilized by the camera 135 are generated and/or stored in a suitable format, such as exchangeable image file format (EXIF) tags or the like. The camera 135 can also communicate with the wireless transceiver 121 to facilitate transmission of images or video captured by the camera 135 to one or more other entities within an associated communication network.

While the camera 135 is illustrated in FIG. 1 as being an internal component of the mobile device 100, the camera 135 may alternatively be an external and/or stand-alone device. For instance, the camera 135 may be a stand-alone digital camera, such as a digital point-and-shoot or digital single-lens reflex (DSLR) camera, which may communicate with the mobile device 135 through one or more external interfaces. These interfaces may include, but are not limited to, wireless communications such as Wi-Fi, Bluetooth, etc., via the wireless transceiver 121, Universal Serial Bus (USB), Firewire, External Serial AT Attachment (eSATA), the Thunderbolt interface developed by Intel Corporation and Apple Incorporated, and/or any other interface(s) suitable for conveying data between the camera 135 and the mobile device 100.

Figure 2:
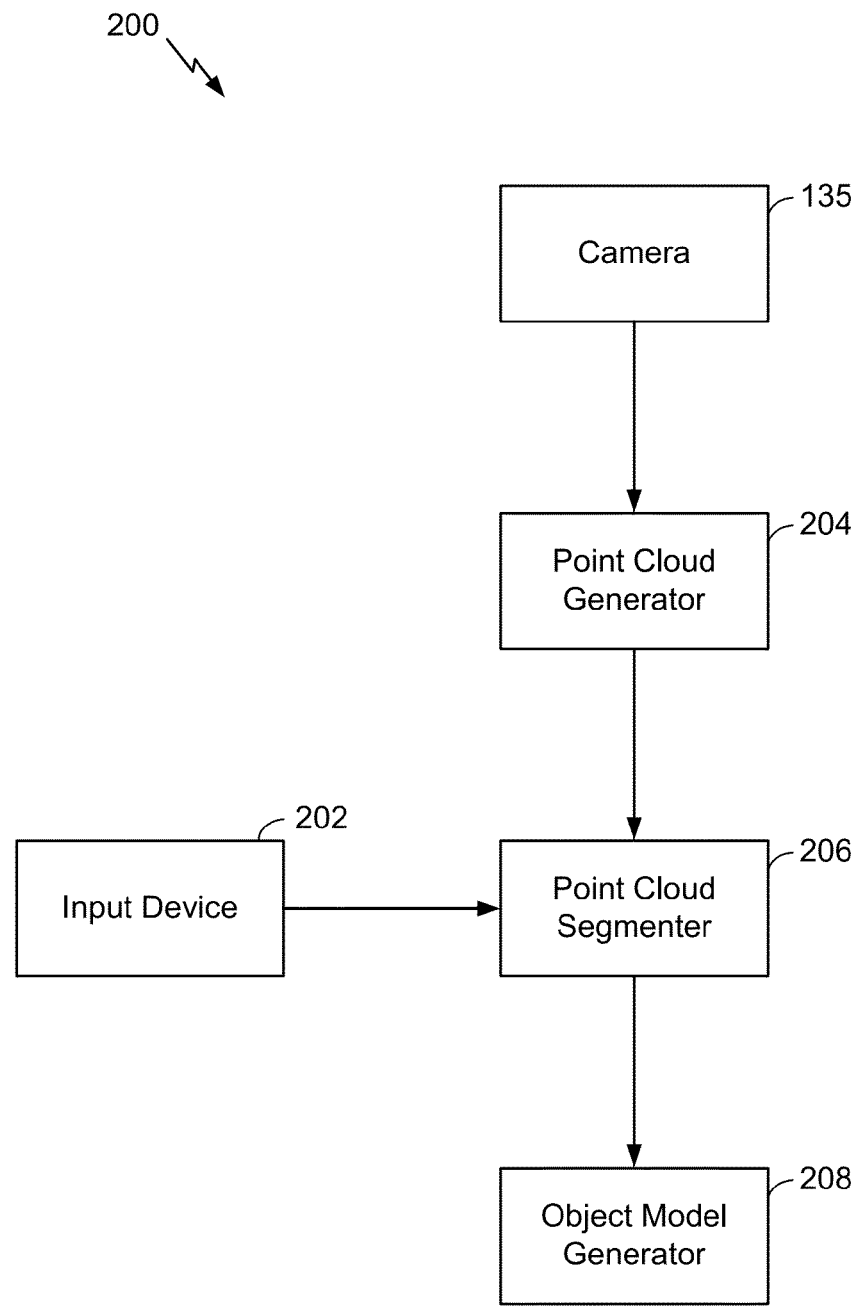
FIG. 2 is a block diagram of a system for user-assisted segmentation of a 3D point cloud.

Referring next to FIG. 2, a system 200 for user-assisted segmentation of a 3D point cloud includes the camera 135, an input device 202 (e.g., a touchscreen or touchpad, keyboard or keypad, mouse, etc.), a point cloud generator 204, a point cloud segmenter 206, and an object model generator 208 which operate as described below. One or more of the point cloud generator 204, point cloud generator 206 and/or object model generator 208 can be implemented in hardware, software (e.g., as software 170 stored on the memory 140 and executed by the general-purpose processor 111), or a combination of hardware and software.

The system 200 is utilized to assist in 3D modeling of an object. In a general 3D modeling application, a user takes multiple 2D images or video of an object (along with background and foreground noise) via the camera 135. The process of generating the 3D model involves various steps, including one where a sparse 3D point cloud is generated by the point cloud generator 204. Here, the system 20 provides a segmentation of the 3D point cloud given minimal user input from an input device 202. In general, the user provides an input via the input device 202 with respect to one of the captured 2D images (or video frames) at a location falling inside an object of interest. This input is then used as a seed, and the segmentation is done on the 3D point cloud by the point cloud segmenter 206 using this seed.

The operation of the system 200 begins by capturing multiple images, or a video sequence, of a scene via the camera 135. The scene includes an object for which a 3D model is to be generated, referred to herein as a "target object" or an "object of interest." The images or video sequence are captured from multiple viewpoints, e.g., by panning or otherwise moving the camera 135 relative to the scene while the images and/or video sequence is captured such that the images and/or video sequence is captured from respective ones of a plurality of angles relative to the scene. Preferably, image data corresponding to captured images and/or video are obtained from a sufficient number of viewpoints such that all or almost all surfaces of the target object are present within the images, although any subset of image data can be used. Using the image data as a reference, the point cloud generator 204 generates a 3D point cloud corresponding to the scene. The points of the 3D point cloud correspond to features detected in the reference image data at the corresponding 3D locations of the features, as computed from the reference image data.

Initially, the point cloud generated by the point cloud generator 204 is a sparse point cloud and contains points corresponding to background noise and/or objects other than the target object. Thus, to simplify processing of the point cloud, the point cloud segmenter 206 at least partially isolates a portion of the point cloud corresponding to the target object. The point cloud segmenter 206 produces a segmented point cloud, which is a pruned version of the original 3D point cloud that contains only the points of the original 3D point cloud within the approximate 3D area of the target object.

The process of segmenting the point cloud begins by receiving a user input from the input device 202. Here, the input device 202 is a touchscreen that displays a live or delayed view of images or video from the camera 135, and the user input is a touch gesture or other gestural input that identifies the target object within the images or video feed. Examples of inputs that could be utilized to identify the target object include touching inside the target object in one of the images; swiping inside the target object; performing a pinching, un-pinching or spreading gesture to define a region in one of the images that includes the target object; drawing a rough outline of the target object; or the like. Non-touch gestures could also be used; for example, a numerical keypad, keyboard, mouse or the like could be used to guide a cursor to a location associated with the target object in one of the images. Other inputs and/or input devices are also possible. For instance, a display of the images or video feed may be presented to the user via a display that is separate from the input device 202. In such a case, the input device 202 may be a touchpad, mouse, keyboard, or other device capable of receiving user inputs and may or may not include display capabilities in addition to those provided by the separate display. For an implementation including a separate input device 202 and display, the input device 202 may relay information relating to user inputs, cursor position, etc., to the display to assist a user in providing input via the input device 202.

Input provided to the input device 202 is used to determine a seed point for the point cloud segmentation performed by the point cloud segmenter 206. In particular, the nearest feature from the seed point is found, and its corresponding 3D point in the point cloud is calculated. This 3D point is then used as the seed for segmentation.

Figure 3:
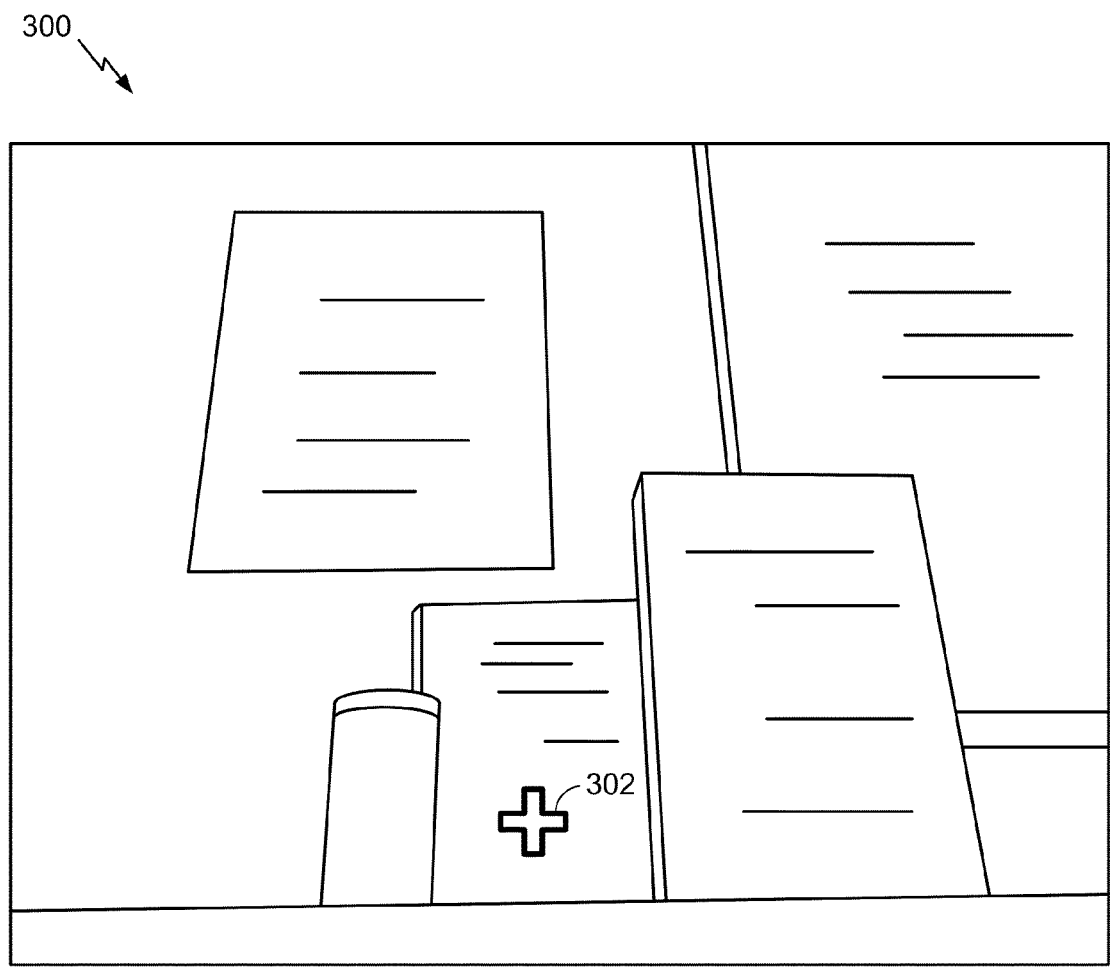
FIGS. 3-4 are illustrative views of techniques for selecting a seed location within a scene from image data associated with the scene to facilitate generation of a pruned 3D scene representation.
Figure 4:
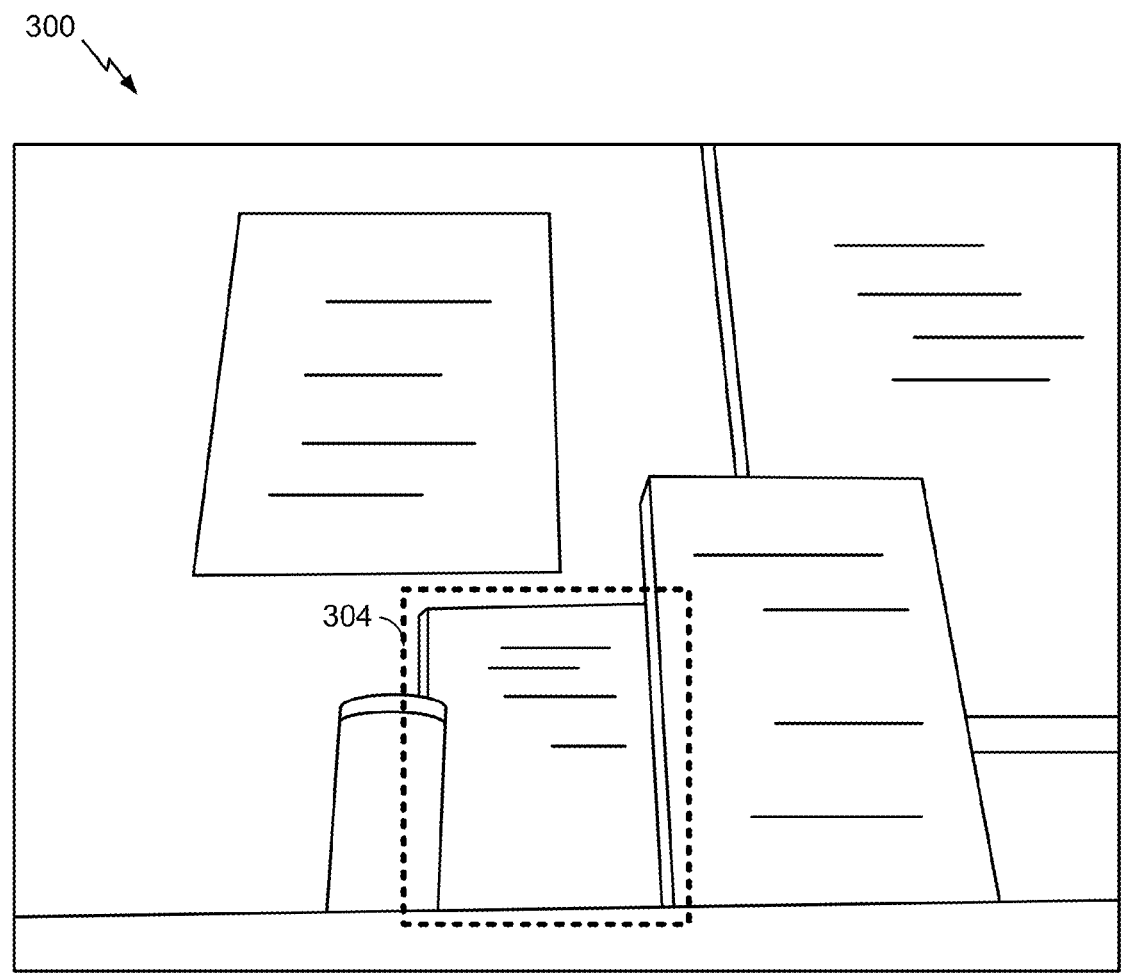

Example techniques that can be employed to select a seed point for segmentation within a scene containing multiple objects are illustrated by FIGS. 3-4. The techniques shown by FIGS. 3-4 are performed with respect to an image 300, which is a sampled image from a sequence of images used to construct a 3D point cloud. Referring first to FIG. 3, a user may select a point as a seed location for segmentation, denoted by a cross 302. The point may be selected, e.g., using the input device 202, by clicking, touching, or otherwise selecting a point within an object of interest within the scene. Alternatively, as shown in FIG. 4, a user may select (e.g., via the input device 202) a region 304 corresponding to the object of interest within the scene. Selection of the region 304 may be performed by performing a pinching or reverse pinching motion with respect to a touch-sensitive input device 202, drawing an outline of the region 304, defining one or more corners of the region 304 (e.g., by performing a dragging motion with respect to the input device 202 from one corner of the region 304 to an opposite corner), etc.

Figure 5:
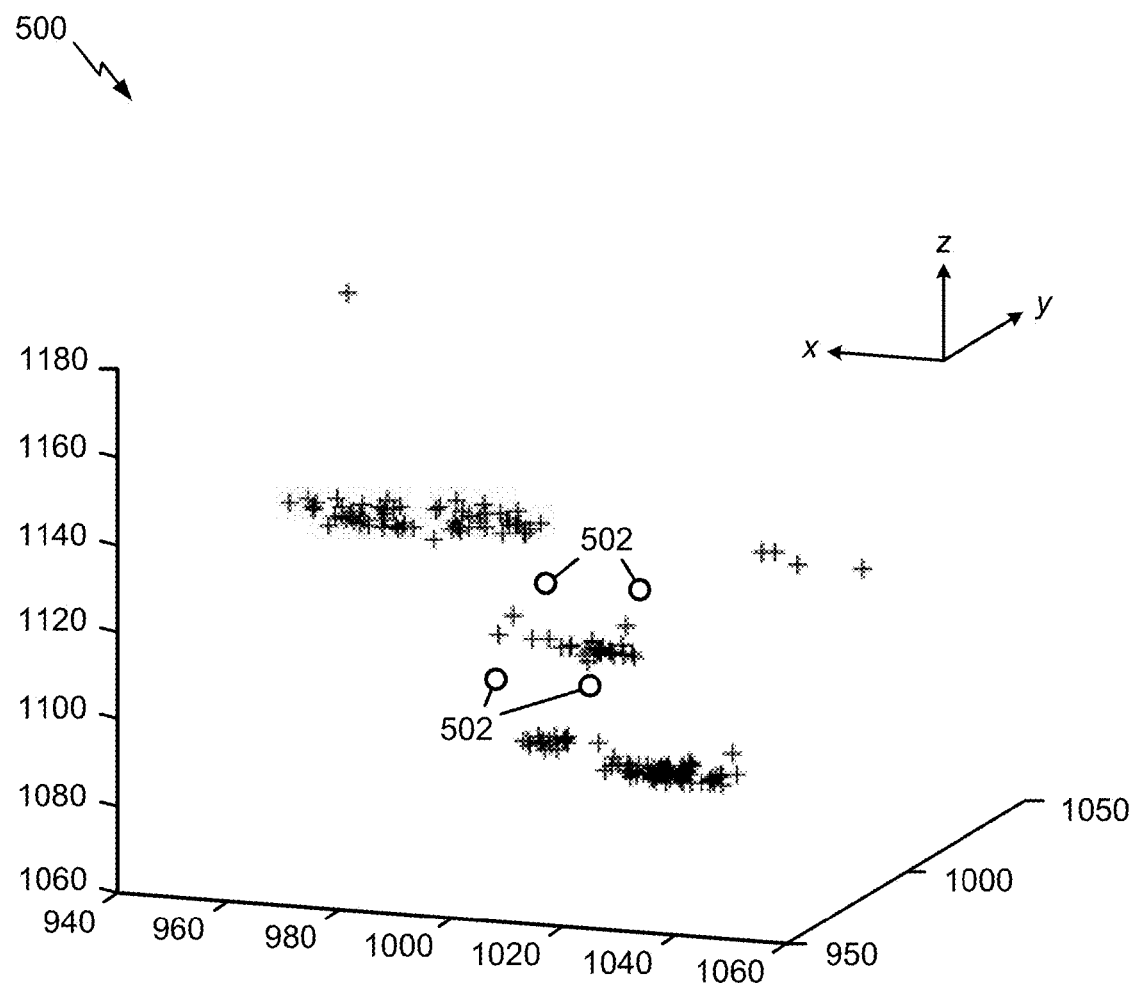
FIG. 5 is an illustrative view of a segmented 3D point cloud generated from the scene shown in FIGS. 3-4.

From the seed point or location, the points of the point cloud closest to the seed location in the 3D space are found. For instance, FIG. 5 shows a diagram 500 that represents a 3D point cloud for the scene associated with image 300. The objects within the scene are shown in diagram 500 as being at different depth layers. Based on the seed selection as performed as described above and illustrated by FIGS. 3-4, a bounding box is automatically estimated in the 3D space. This bounding box is represented in FIG. 5 by a set of points 502. As described in further detail below, further processing of the point cloud is subsequently performed only on the points within this bounding box, thereby reducing the complexity associated with processing the point cloud.

Figure 6:
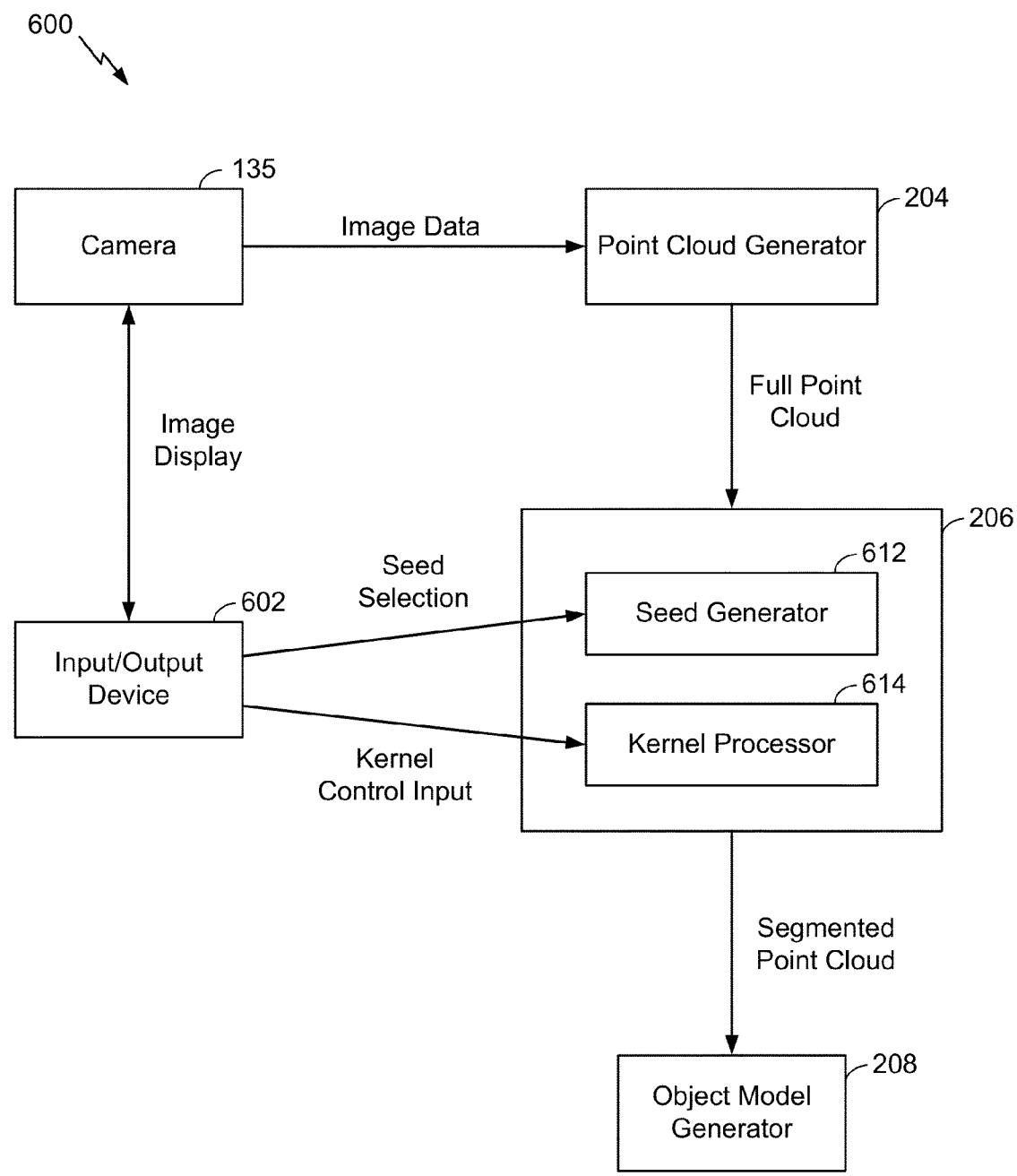
FIG. 6 is a block diagram of a system for creating and segmenting a point cloud corresponding to a 3D scene based on image data and user input.

As noted above, the point cloud segmenter 206 generates a segmented point cloud from an initial 3D point cloud by determining the points in the point cloud that are closest to the seed location. Here, these points are found by weighing and using kernels. FIG. 6 illustrates a system 600 of utilizing kernels in combination with user input to process a 3D point cloud. The following description relates to a triangular kernel, although other kernels, such as a Gaussian kernel, could also be used.

As shown by system 600, a camera 135 captures image data (e.g., images and/or a video sequence) associated with a scene. This image data is provided to the point cloud generator 204 for generation of a 3D point cloud corresponding to the scene. Additionally, the image data is provided to an input/output device 602. The input/output device 602 comprises one or more devices that enable display of the image data as well as user input functionality. A single device, such as a capacitive or resistive touchscreen, or multiple devices, such as a display screen in combination with a mouse, touchpad, keyboard, keypad or the like, may be used.

At least a portion of data corresponding to the point cloud created by the point cloud generator 204 is provided to the point cloud segmenter 206 for further processing. Information may be conveyed from the point cloud generator 204 to the point cloud segmenter 206 in approximately real time as the information is generated, or alternatively data may be buffered and/or otherwise stored (e.g., by a memory 140) and provided to the point cloud segmenter 206 at a later time. A seed generator 612 receives seed selection input from the input/output device 602 and creates a seed location within the point cloud for segmentation as generally described above.

Based on the point cloud and the selected seed location, a kernel processor 614 utilizes one or more triangular kernels or other kernels to define a bounding area surrounding the seed location and to determine the points within the full point cloud that are within the bounding area.

Here, two triangular kernels are utilized by the kernel processor 614, in particular a first kernel along the (x, y) direction and a second kernel along the z direction, assuming a three-dimensional (x, y, z) coordinate system. The first kernel weighs points inversely to their distance from the seed location in the (x, y) plane as follows:

$$\text{distSquared}(j) = (*(\text{corner}X+j)-\text{center}X)^2 + (*(\text{corner}Y+j)-\text{center}Y)^2;$$

$$\text{weightedDistSquared}(j) = q_{const} - (q_{const} \times (\text{distSquared}+j))/\text{slope};$$

where distSquared is the $L^2$ distance between the seed and the surrounding pixels (e.g., in the (x, y) plane), weightedDistSquared is the weighing scheme used by the kernel, slope is the size of the kernel, and $q_{const}$ is a quantizing constant. The parameters cornerX, cornerY and cornerZ denote the corner locations of the 3D point cloud, and centerX and centerY represent the seed location in the (x, y) plane.

The size of the kernel is initialized with respect to the total range of the point cloud in the x and y directions. Here, ⅓ of the range of (x, y) in the 3D point cloud is used, although other initial sizes are possible. In other words, the kernel is initialized by assuming that the target object is occupying at least ⅓ of the scene in the (x, y) plane. As further shown in FIG. 6, kernel control input may be provided via the input/output device 602 or by other suitable means to increase or decrease the kernel size interactively during operation of the kernel processor 614.

The second kernel is along the z direction. Here, the second kernel is smaller than the first kernel and acts as a regularization term for the first kernel. Both kernels combined intersect and segment the 3D space.

Irrespective of the kernel type utilized, a user may provide kernel control input and/or otherwise adjust one or more kernel properties via the input/output device 602 or other means. For instance, the height of the kernel and/or the length of one or more sides of the kernel extending from the kernel midpoint can be adjusted. The sides may be adjusted in a non-uniform manner such that the kernel is skewed and more heavily weighs points in one direction. Further, in addition to kernels, other properties of the 3D points such as color, texture, etc., can also be utilized by the point cloud segmenter 206 in weighing the points of the 3D point cloud.

Once the 3D space is pruned by the point cloud segmenter 206 using the above techniques, the densest regions of the point cloud around the seed point are determined. This new 3D space is then further processed by the object model generator 208. The result of the object model generator 208 is an uncluttered model of the target object, which can subsequently be shared with other applications or devices, used as a reference for other objects in the scene, or other purposes. In contrast to previous approaches in which the entire scene represented by the captured images is reconstructed, the system 600 utilizes user interaction to limit reconstruction to the target object. As a result, the complexity associated with model generation is reduced, increasing efficiency and enabling model generation to be performed on mobile devices and/or other computing devices with insufficient processing power or resources to generate models corresponding to an entire scene.

Segmenting a point cloud in the context of dense 3D modeling as described above provides several benefits. For instance, Bundle Adjustment converges much faster, it becomes easier to densify the resulting smaller sparse cloud using tessellation or other techniques such as plane fitting, and it results in an uncluttered model being provided to the end user. Other benefits are realized, as described above.

Figure 7:
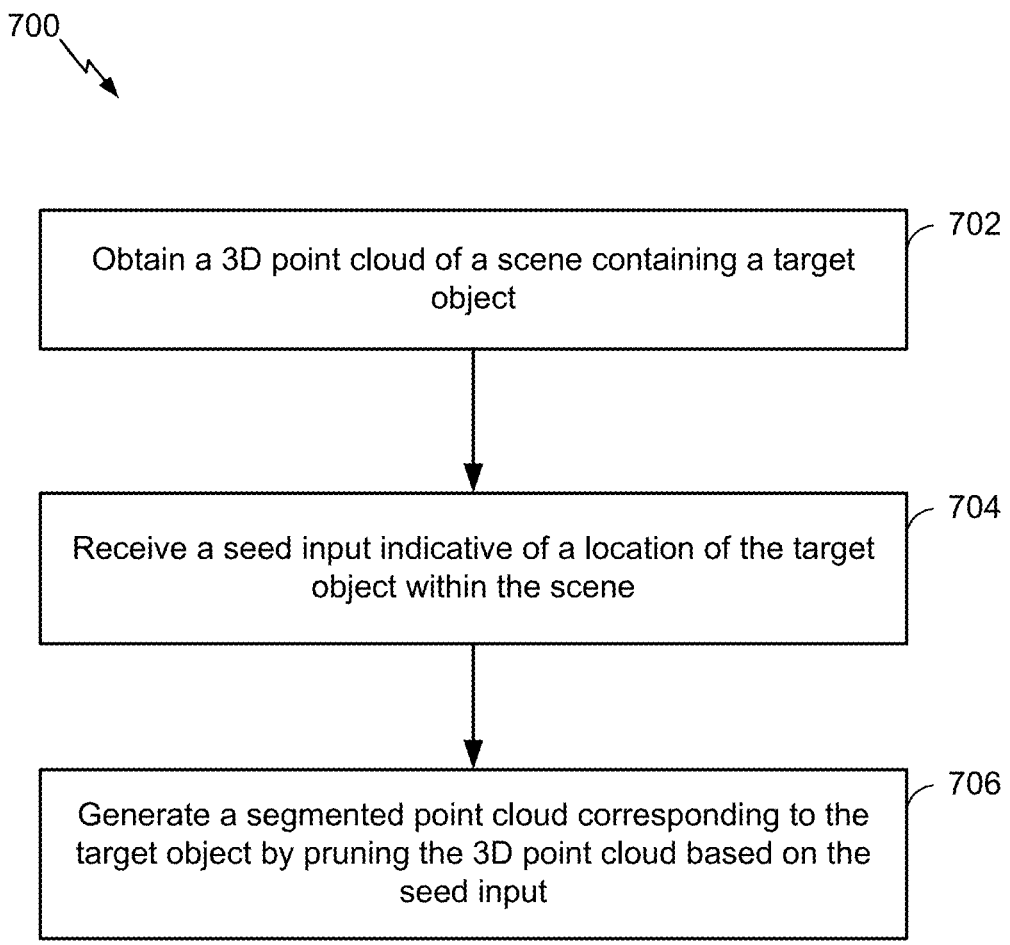
FIG. 7 is a block flow diagram of a process of user-assisted segmentation of a 3D point cloud.

Referring to FIG. 7, with further reference to FIGS. 1-6, a process 700 of user-assisted segmentation of a 3D point cloud includes the stages shown. The process 700 is, however, an example only and not limiting. The process 700 can be altered, e.g., by having stages added, removed, rearranged, combined, and/or performed concurrently. Still other alterations to the process 700 as shown and described are possible.

At stage 702, a 3D point cloud of a scene containing a target object is obtained. The point cloud is obtained by, e.g., generating the point cloud via a point cloud generator 204 based on images captured by a camera 135, received via a wireless transceiver 121, etc. The point cloud generator 204 may be implemented in software and/or hardware. For a software implementation, the point cloud generator 204 is implemented via a processor 111 executing computer-readable and processor-executable software code stored on a memory 140.

At stage 704, a seed input is received that is indicative of a location of the target object within the scene. The seed input is a gestural input (e.g., a tap or touch, swipe, pinch or reverse pinch, drawn outline, etc.) that identifies the target object within an image of the scene. Other user inputs could also be utilized. While FIG. 7 illustrates that the 3D point cloud is generated at stage 702 and the user input is obtained at stage 704, these stages may occur in any order at any suitable time(s). For instance, a user input can be obtained as described at stage 704 with respect to an image of the scene either before or during generation of the 3D point cloud as described at stage 702. In this case, the user input 704 can be buffered or otherwise stored (e.g., in a memory 140) and later recalled upon completion of the 3D point cloud.

At stage 706, a segmented point cloud is generated, e.g., by the point cloud segmenter 206. The segmented point cloud corresponds to the target object and is generated by pruning the 3D point cloud generated at stage 702 based on the seed input obtained at stage 704. Segmentation at stage 706 can be performed in any manner suitable for isolating an area of the 3D point cloud corresponding to the target object. Segmentation techniques that can be utilized include those based on triangular or Gaussian kernels, color or texture regularization, or the like, as generally described above. The point cloud segmenter 206 may be implemented in software and/or hardware. For a software implementation, the point cloud segmenter 206 is implemented via a processor 111 executing computer-readable and processor-executable software code stored on a memory 140.

Figure 8:
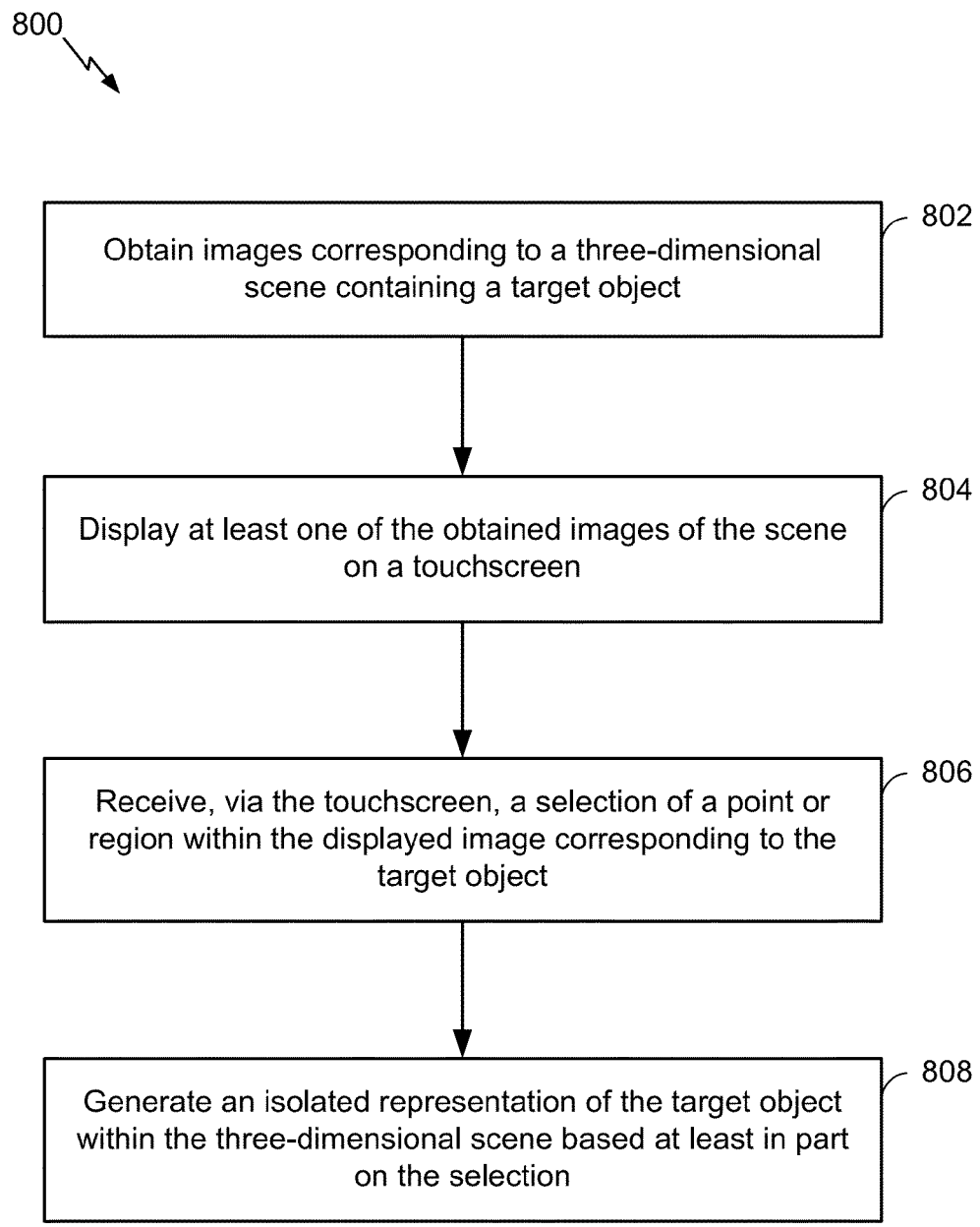
FIG. 8 is a block flow diagram of a process of generating a representation of an object associated with a seed location within a scene.

Referring next to FIG. 8, with further reference to FIGS. 1-6, a process 800 of generating a representation of an object associated with a seed location within a scene includes the stages shown. The process 800 is, however, an example only and not limiting. The process 800 can be altered, e.g., by having stages added, removed, rearranged, combined, and/or performed concurrently. Still other alterations to the process 800 as shown and described are possible.

At stage 802, images are obtained (e.g., via a camera 135) that correspond to a 3D scene containing a target object. The images may be still images, frames of a video sequence, and/or any other images suitable for conveying information relating to the scene and the objects therein.

At stage 804, at least one of the images obtained at stage 804 is displayed on a touchscreen. The displayed image(s) may be provided to the touchscreen in real time or near real time, or alternatively the image(s) may be buffered, e.g., by a memory 140, and displayed at a later time.

At stage 806, a selection of a point or region within the displayed image that corresponds to the target object is received via the touchscreen. As described above, the selection may include one or more gestural inputs performed with respect to the touchscreen. These gestural inputs may include, but are not limited to, one or more tap or touch gestures (either simultaneously or in succession), a dragging gesture, a pinching or reverse pinching (expanding) gesture, etc.

At stage 808, an isolated representation of the target object within the three-dimensional scene is generated based at least in part on the selection received at stage 806. Here, the isolated representation of the target object is generated based on a point cloud representation of the scene and the target object, as generally described above. Other techniques are also possible.

Figure 9:
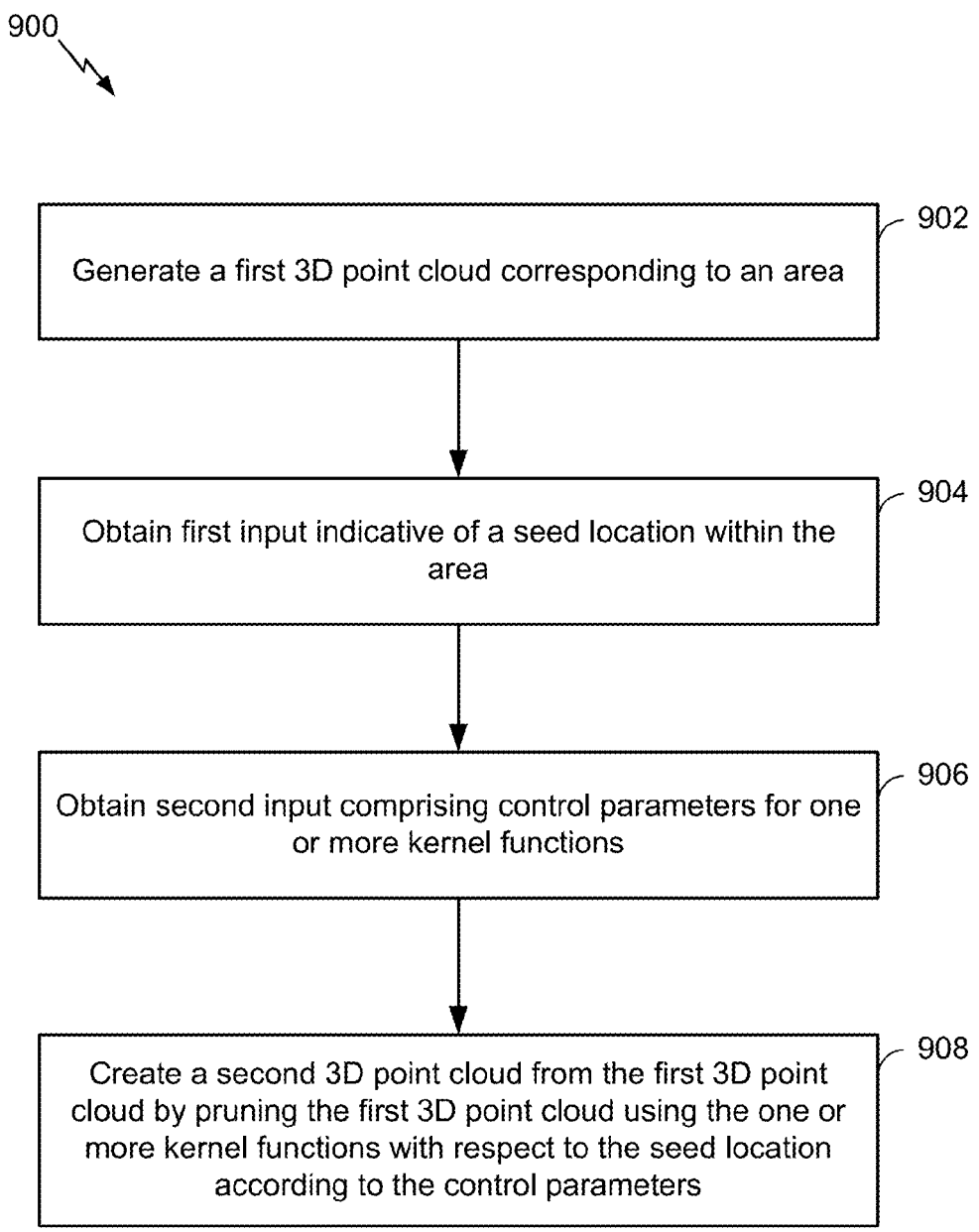
FIG. 9 is a block flow diagram of a process of pruning a 3D point cloud according to one or more kernel functions and associated control parameters.

Referring to FIG. 9, with further reference to FIGS. 1-6, a process 900 of pruning a 3D point cloud according to one or more kernel functions and associated control parameters includes the stages shown. The process 900 is, however, an example only and not limiting. The process 900 can be altered, e.g., by having stages added, removed, rearranged, combined, and/or performed concurrently. Still other alterations to the process 900 as shown and described are possible.

At stage 902, a first 3D point cloud corresponding to an area is generated. The area corresponds to, e.g., some or all of a 3D scene and/or other predefined 3D space.

At stage 904, first input indicative of a seed location (e.g., a seed point or seed region) within the area associated with the first 3D point cloud is obtained. The input is obtained using one or more input/output devices 602, as generally described above. The seed location corresponds to a desired 3D subset of the area associated with the first 3D point cloud.

At stage 906, second input comprising control parameters for one or more kernel functions, such as triangular kernels or Gaussian kernels, is obtained. The second input may be obtained via the same input/output devices as the first input, or different devices may be used for the first and second inputs. Here, the control parameters relate to size and/or other properties of the kernel functions, as generally described above.

At stage 908, a second 3D point cloud is created from the first 3D point cloud by pruning the first 3D point cloud using the one or more kernel functions with respect to the seed location according to the control parameters obtained at stage 906. The second 3D point cloud is a segmented subset of the first 3D point cloud. Here, the second 3D point cloud corresponds to a sub-area corresponding to the seed location, such as an object located at the seed location and/or an arbitrary or non-arbitrary portion of 3D space surrounding the seed location.

Figure 10:
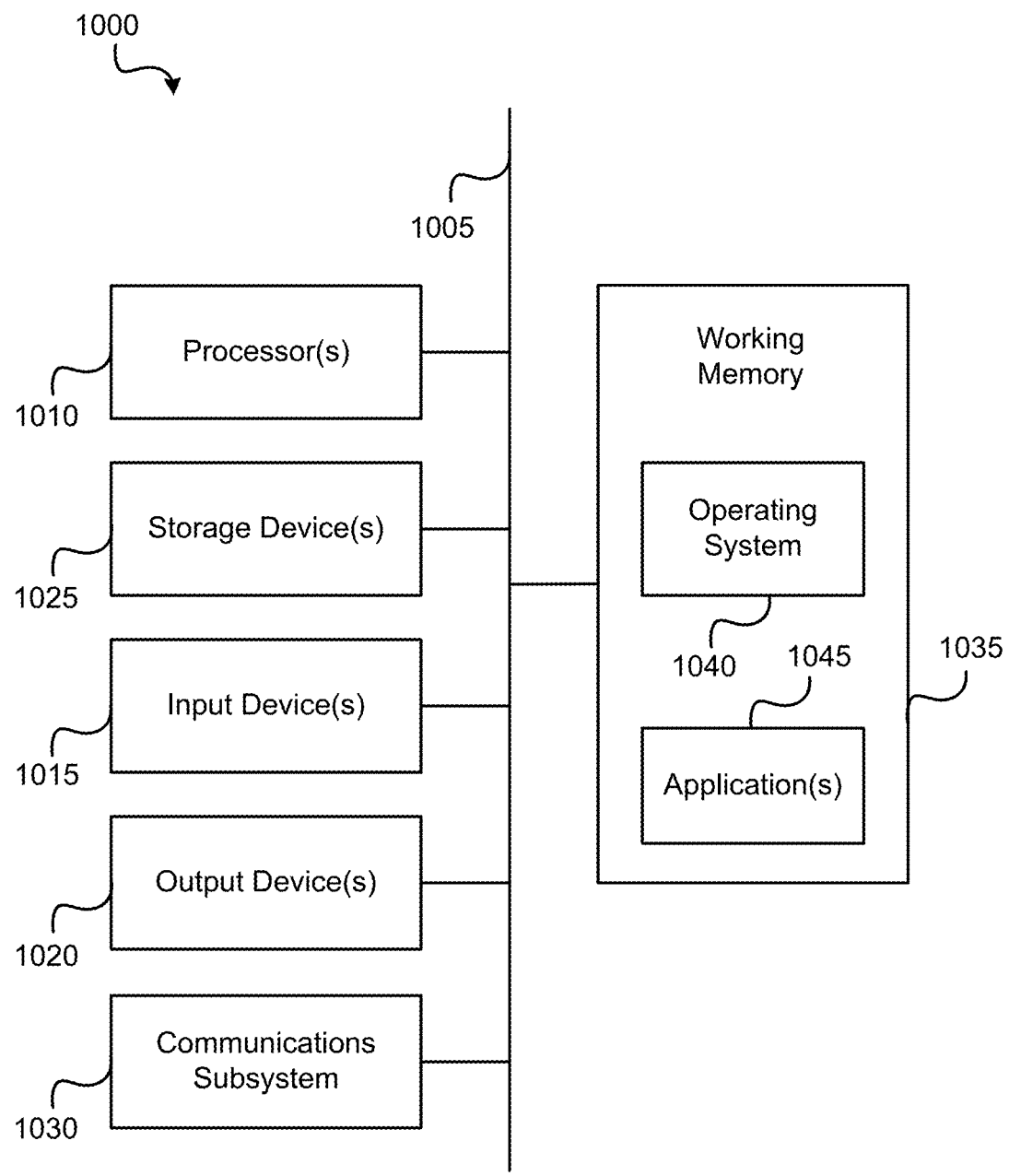
FIG. 10 is a block diagram of an example of a computer system.

A computer system 1000 as illustrated in FIG. 10 may be utilized to at least partially implement the functionality of the previously described computerized devices. FIG. 10 provides a schematic illustration of one embodiment of a computer system 1000 that can perform the methods provided by various other embodiments, as described herein, and/or can function as a mobile device or other computer system. FIG. 10 provides a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like. The processor(s) 1010 can include, for example, intelligent hardware devices, e.g., a central processing unit (CPU) such as those made by Intel® Corporation or AMD®, a microcontroller, an ASIC, etc. Other processor types could also be utilized.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise, as here, a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as the system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 1000) may be used to perform methods in accordance with the disclosure. Some or all of the procedures of such methods may be performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for user-assisted segmentation of a three-dimensional (3D) point cloud implemented in a computing device, the method comprising:
   obtaining, using the computing device, a 3D point cloud of a scene containing a target object by capturing a plurality of images of the scene from respective ones of a plurality of angles and generating the 3D point cloud based on the plurality of images;
   receiving, using the computing device, a seed input indicative of the target object within the scene, wherein receiving the seed input comprises receiving a touch gesture input corresponding to a location associated with the target object in a selected image of the plurality of images; and
   generating, using the computing device, a segmented point cloud corresponding to the target object by pruning the 3D point cloud based on the seed input by selecting at least one 3D point of the 3D point cloud located in a position associated with the seed input and generating the segmented point cloud relative to the at least one selected 3D point.

2. The method of claim 1 wherein receiving the seed input further comprises:
   displaying the selected image on a touchscreen; and
   receiving the touch gesture input via the touchscreen.

3. The method of claim 2 wherein receiving the touch gesture input comprises receiving at least one of a tap input at the location associated with the target object in the selected image, a swipe input at the location associated with the target object in the selected image, a pinch or reverse pinch input defining an area within the selected image that contains the target object, or a drag input defining an outline of the target object within the selected image or opposing corners of an area containing the target object within the selected image.

4. The method of claim 1 wherein:
   selecting at least one 3D point of the 3D point cloud located in a position associated with the seed input comprises estimating a 3D seed point corresponding to the seed input, and selecting a 3D point of the 3D point cloud which is nearest to the seed 3D point.

5. The method of claim 1 wherein:
   receiving the user input comprises:
      receiving the user input prior to completing generation of the 3D point cloud; and
      storing the user input; and
   generating the segmented point cloud comprises recalling the user input and pruning the 3D point cloud based on the recalled user input.

6. A method for user-assisted segmentation of a three-dimensional (3D) point cloud implemented in a computing device, the method comprising:
   obtaining, using the computing device, a 3D point cloud of a scene containing a target object by capturing a plurality of images of the scene from respective ones of a plurality of angles with a camera and generating the 3D point cloud based on the plurality of images;
   receiving, using the computing device, a seed input indicative of the target object within the scene, wherein receiving the seed input comprises receiving a touch gesture input corresponding to a location associated with the target object in a selected image of the plurality of images; and
   generating, using the computing device, a segmented point cloud corresponding to the target object by pruning the 3D point cloud based on the seed input, wherein capturing the plurality of images of the scene comprises capturing a video sequence of the scene, the video sequence comprising the plurality of images.

7. The method of claim 1 wherein capturing the plurality of images of the scene comprises capturing a plurality of still images of the scene.

8. A method for user-assisted segmentation of a three-dimensional (3D) point cloud implemented in a computing device, the method comprising:
   obtaining, using the computing device, a 3D point cloud of a scene containing a target object;
   receiving, using the computing device, a seed input indicative of the target object within the scene, wherein receiving the seed input comprises receiving a touch gesture input corresponding to a location associated with the target object in a selected image of the plurality of images; and
   generating, using the computing device, a segmented point cloud corresponding to the target object by pruning the 3D point cloud based on the seed input, wherein generating the segmented point cloud comprises pruning the 3D point cloud using at least one kernel.

9. The method of claim 6 wherein the at least one kernel comprises one or more of a triangular kernel or a Gaussian kernel.

10. The method of claim 6 wherein generating the segmented point cloud further comprises adjusting one or more parameters of the at least one kernel based on kernel control input.

11. The method of claim 1 further comprising generating a 3D model of the target object based on the segmented point cloud.

12. An apparatus that facilitates user-assisted segmentation of a three-dimensional (3D) point cloud, the apparatus comprising:
   a camera configured to capture a plurality of images of the scene from respective ones of a plurality of angles;
   a point cloud generator coupled to the camera and the point cloud segmenter and configured to generate a 3D point cloud of a scene containing a target object based on the plurality of images;
   a point cloud segmenter coupled to the point cloud generator and configured to obtain the 3D point cloud from the point cloud generator configured to obtain the 3D point cloud from the point cloud generator; and
   an input device coupled to the point cloud segmenter and configured to receive a seed input indicative of the target object within the scene, the input device being configured to receive the seed input as a touch gesture input corresponding to a location associated with the target object in a selected image of the plurality of images;
   wherein the point cloud segmenter is further configured to generate a segmented point cloud corresponding to the target object by pruning the 3D point cloud based on the seed input, and wherein the point cloud segmenter is further configured to select at least one 3D point of the 3D point cloud located in a position associated with the seed input, and to generate the segmented point cloud relative to the at least one selected 3D point.

13. The apparatus of claim 12 wherein the input device comprises a touchscreen configured to display the selected image and receive the touch gesture input.

14. The apparatus of claim 12 wherein the touch gesture input comprises at least one of a tapping input, a swiping input, a pinching input, an expanding input, or a dragging input.

15. An apparatus that facilitates user-assisted segmentation of a three-dimensional (3D) point cloud, the apparatus comprising:
- a camera configured to capture a plurality of images of the scene from respective ones of a plurality of angles;
- a point cloud generator coupled to the camera and the point cloud segmenter and configured to generate a 3D point cloud of a scene containing a target object based on the plurality of images;
- a point cloud segmenter coupled to the point cloud generator and configured to obtain the 3D point cloud from the point cloud generator;
- an input device coupled to the point cloud segmenter and configured to receive a seed input indicative of the target object within the scene, the input device being configured to receive the seed input as a touch gesture input corresponding to a location associated with the target object in a selected image of the plurality of images;
- wherein the point cloud segmenter is further configured to generate a segmented point cloud corresponding to the target object by pruning the 3D point cloud based on the seed input,
- wherein the camera is configured to capture the plurality of images of the scene as at least one of a video sequence of the scene, the video sequence comprising the plurality of images, or a plurality of still images of the scene.

16. An apparatus that facilitates user-assisted segmentation of a three-dimensional (3D) point cloud, the apparatus comprising:
- a point cloud segmenter configured to obtain a 3D point cloud of a scene containing a target object; and
- an input device coupled to the point cloud segmenter and configured to receive a seed input indicative of the target object within the scene, the input device being configured to receive the seed input as a touch gesture input corresponding to a location associated with the target object in a selected image of the plurality of images;
- wherein the point cloud segmenter is further configured to generate a segmented point cloud corresponding to the target object by pruning the 3D point cloud based on the seed input, and wherein the point cloud segmenter is further configured to prune the 3D point cloud using at least one kernel.

17. The apparatus of claim 16 wherein the at least one kernel comprises one or more of a triangular kernel or a Gaussian kernel.

18. The apparatus of claim 16 wherein:
- the input device is further configured to obtain a kernel control input and provide the kernel control input to the point cloud segmenter; and
- the point cloud segmenter is further configured to adjust one or more parameters of the at least one kernel based on the kernel control input.

19. An apparatus that facilitates user-assisted segmentation of a three-dimensional (3D) point cloud, the apparatus comprising:
- means for obtaining a 3D point cloud of a scene containing a target object further comprising means for capturing a plurality of images of the scene from respective ones of a plurality of angles and means for generating the 3D point cloud based on the plurality of images, the means for capturing comprising a camera;
- means for receiving a seed input indicative of the target object within the scene, the means for receiving the seed input comprising means for receiving a touch gesture input corresponding to a location associated with the target object in a selected image of the plurality of images; and
- means for generating a segmented point cloud corresponding to the target object by pruning the 3D point cloud based on the seed input, the means for generating the segmented point cloud further comprising means for selecting at least one 3D point of the 3D point cloud located in a position associated with the seed input, and means for generating the segmented point cloud relative to the at least one selected 3D point.

20. The apparatus of claim 19 wherein the means for receiving the user input further comprises:
- means for displaying the selected image; and
- means for receiving the touch gesture input.

21. The apparatus of claim 19 wherein the touch gesture input comprises at least one of a tapping input, a swiping input, a pinching input, an expanding input, or a dragging input.

22. An apparatus that facilitates user-assisted segmentation of a three-dimensional (3D) point cloud, the apparatus comprising:
- means for obtaining a 3D point cloud of a scene containing a target object further comprising means for capturing a plurality of images of the scene from respective ones of a plurality of angles and means for generating the 3D point cloud based on the plurality of images, the means for capturing comprising a camera;
- means for receiving a seed input indicative of the target object within the scene, the means for receiving the seed input comprising means for receiving a touch gesture input corresponding to a location associated with the target object in a selected image of the plurality of images; and
- means for generating a segmented point cloud corresponding to the target object by pruning the 3D point cloud based on the seed input,
- wherein the means for capturing a plurality of images of the scene comprises means for capturing at least one of a video sequence of the scene, the video sequence comprising the plurality of images, or a plurality of still images of the scene.

23. An apparatus that facilitates user-assisted segmentation of a three-dimensional (3D) point cloud, the apparatus comprising:
- means for obtaining a 3D point cloud of a scene containing a target object, the means for obtaining the 3D point cloud comprises a camera;
- means for receiving a seed input indicative of the target object within the scene, the means for receiving the seed input comprising means for receiving a touch gesture input corresponding to a location associated with the target object in a selected image of the plurality of images; and
- means for generating a segmented point cloud corresponding to the target object by pruning the 3D point cloud based on the seed input, wherein the means for generating the segmented point cloud comprises means for pruning the 3D point cloud using at least one kernel.

24. The apparatus of claim 23 wherein the at least one kernel comprises one or more of a triangular kernel or a Gaussian kernel.

25. The apparatus of claim 23 wherein the means for generating the segmented point cloud further comprises means for adjusting one or more parameters of the at least one kernel based on kernel control input.

26. A computer program product residing on a processor-executable, non-transitory computer storage medium, the computer program product comprising processor-executable instructions configured to cause a processor to:
- obtain a three-dimensional (3D) point cloud of a scene containing a target object by capturing a plurality of images of the scene from respective ones of a plurality of angles via a camera and generating the 3D point cloud based on the plurality of images;
- receive a seed input indicative of the target object within the scene, the instructions configured to cause the processor to receive the seed input comprising instructions configured to cause the processor to receive a touch gesture input corresponding to a location associated with the target object in a selected image of the plurality of images; and
- generate a segmented point cloud corresponding to the target object by pruning the 3D point cloud based on the seed input, wherein the instructions configured to cause the processor to generate the segmented point cloud comprise instructions configured to cause the processor to select at least one 3D point of the 3D point cloud located in a position associated with the seed input, and to generate the segmented point cloud relative to the at least one selected 3D point.

27. The computer program product of claim 26 wherein the instructions configured to cause the processor to receive the seed input comprise instructions configured to cause the processor to:
- display the selected image on a touchscreen; and
- receive the touch gesture input via the touchscreen.

28. The computer program product of claim 26 wherein the touch gesture input comprises at least one of a tapping input, a swiping input, a pinching input, an expanding input, or a dragging input.

29. A computer program product residing on a processor-executable, non-transitory computer storage medium, the computer program product comprising processor-executable instructions configured to cause a processor to:
- obtain a three-dimensional (3D) point cloud of a scene containing a target object by capturing a plurality of images of the scene from respective ones of a plurality of angles via a camera and generating the 3D point cloud based on the plurality of images;
- receive a seed input indicative of the target object within the scene, the instructions configured to cause the processor to receive the seed input comprising instructions configured to cause the processor to receive a touch gesture input corresponding to a location associated with the target object in a selected image of the plurality of images; and
- generate a segmented point cloud corresponding to the target object by pruning the 3D point cloud based on the seed input, and
- wherein the instructions configured to cause the processor to capture a plurality of images of the scene are further configured to cause the processor to capture at least one of a video sequence of the scene, the video sequence comprising the plurality of images, or a plurality of still images of the scene.

30. A computer program product residing on a processor-executable, non-transitory computer storage medium, the computer program product comprising processor-executable instructions configured to cause a processor to:
- obtain a three-dimensional (3D) point cloud of a scene containing a target object;
- receive a seed input indicative of the target object within the scene, the instructions configured to cause the processor to receive the seed input comprising instructions configured to cause the processor to receive a touch gesture input corresponding to a location associated with the target object in a selected image of the plurality of images; and
- generate a segmented point cloud corresponding to the target object by pruning the 3D point cloud based on the seed input, wherein the instructions configured to cause the processor to generate the segmented point cloud comprise instructions configured to cause the processor to prune the 3D point cloud using at least one kernel.

31. The computer program product of claim 30 wherein the at least one kernel comprises one or more of a triangular kernel or a Gaussian kernel.

32. The computer program product of claim 30 wherein the instructions configured to cause the processor to generate the segmented point cloud comprise instructions configured to cause the processor to adjust one or more parameters of the at least one kernel based on kernel control input.

* * * * *